US010024271B2

(12) United States Patent
Thomas

(10) Patent No.: US 10,024,271 B2
(45) Date of Patent: Jul. 17, 2018

(54) METHODS AND SYSTEMS FOR COOLING AIRFLOW

(71) Applicant: UNITED TECHNOLOGIES CORPORATION, Hartford, CT (US)

(72) Inventor: Michael R. Thomas, Bloomfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 306 days.

(21) Appl. No.: 15/004,694

(22) Filed: Jan. 22, 2016

(65) Prior Publication Data

US 2017/0211513 A1 Jul. 27, 2017

(51) Int. Cl.
F02C 7/12 (2006.01)
F02K 3/02 (2006.01)
F02C 7/18 (2006.01)
F02K 3/04 (2006.01)
F02K 3/06 (2006.01)

(52) U.S. Cl.
CPC ............... F02K 3/025 (2013.01); F02C 7/12 (2013.01); F02C 7/18 (2013.01); F02C 7/185 (2013.01); F02K 3/04 (2013.01); F02K 3/06 (2013.01)

(58) Field of Classification Search
CPC ... F02K 3/025; F02K 3/04; F02K 3/06; F02C 7/12; F02C 7/18; F02C 7/185
See application file for complete search history.

(56) References Cited

U.S. PATENT DOCUMENTS

| 2008/0053060 | A1* | 3/2008 | Olver | F02C 7/14 60/226.1 |
| 2013/0186102 | A1* | 7/2013 | Lo | F02C 7/18 60/785 |
| 2013/0236299 | A1 | 9/2013 | Kington et al. | |
| 2015/0114611 | A1 | 4/2015 | Morris et al. | |

FOREIGN PATENT DOCUMENTS

EP 0924409 6/1999
EP 1033484 9/2000

OTHER PUBLICATIONS

Extended European Search Report dated Jun. 21, 2017 in European Application No. 17152241.0.

* cited by examiner

Primary Examiner — Steven Sutherland
(74) Attorney, Agent, or Firm — Snell & Wilmer L.L.P.

(57) ABSTRACT

Methods and systems for cooling airflow may comprise a gas turbine engine that may comprise an engine core, comprising a chamber, and/or a heat exchanger. The chamber may comprise a chamber outboard surface and/or a chamber interior. The heat exchanger may be coupled to the chamber outboard surface and may comprise a heat exchanger base and/or a cooling tube. The cooling tube may be disposed inside the chamber interior and may comprise a tube entrance end coupled to the heat exchanger base, a tube exit end coupled to the heat exchanger base, and/or a tube body between the tube entrance end and the tube exit end, the tube body encompassing a tube interior.

20 Claims, 5 Drawing Sheets

METHODS AND SYSTEMS FOR COOLING AIRFLOW

FIELD

The present disclosure relates generally to gas turbine engines. More particularly, the present disclosure relates to cooling airflow within a gas turbine engine.

BACKGROUND

Gas turbine engines tend to perform efficiently when operated at relatively high temperatures. Gas turbine engines benefit from effective cooling systems to maintain integrity of various components.

SUMMARY

In various embodiments, a gas turbine engine may comprise an engine core, comprising a chamber, and/or a heat exchanger. The chamber may comprise a chamber outboard surface and/or a chamber interior. The heat exchanger may be coupled to the chamber outboard surface and may comprise a heat exchanger base and/or a cooling tube. The cooling tube may be disposed inside the chamber interior and may comprise a tube entrance end coupled to the heat exchanger base, a tube exit end coupled to the heat exchanger base, and/or a tube body between the tube entrance end and the tube exit end, the tube body encompassing a tube interior.

In various embodiments, the gas turbine engine may comprise a bypass airflow channel which may exist outside of the engine core. The bypass airflow channel may be configured to allow a bypass airflow. The tube entrance end and/or the tube exit end may be in fluid communication with the bypass airflow channel. The cooling tube may be configured to allow a cooling bypass airflow to enter the tube interior through the tube entrance end and exit the tube interior through the tube exit end.

In various embodiments, the cooling tube may form a U-shape. In various embodiments, the chamber may comprise a chamber side surface coupled to the chamber outboard surface, wherein the chamber side surface may comprise a side surface inlet configured to allow a hot secondary airflow into the chamber interior. The engine core may be configured to have an entirety of the hot secondary airflow travel into the chamber interior. In various embodiments, the heat exchanger may be configured to cool the hot secondary airflow in the chamber to produce a cooled secondary airflow.

In various embodiments, the chamber may comprise a chamber exit surface coupled to the chamber outboard surface and/or the chamber side surface. The chamber exit surface may comprise an exit hole configured to allow a cooled secondary airflow out of the chamber interior.

In various embodiments, the heat exchanger may be disposed forward of a combustor. In various embodiments, the heat exchanger may be bolted to the chamber outboard surface. In various embodiments, the tube interior may be physically isolated from the chamber interior.

A method of cooling airflow in a gas turbine engine, in accordance with various embodiments, may comprise passing a cooling bypass airflow, from a bypass airflow channel existing outside of an engine core, through a cooling tube comprised in a heat exchanger. The heat exchanger may be coupled to a chamber. The cooling tube may be disposed inside the chamber. The chamber may be comprised in the engine core. The method may comprise directing a hot secondary airflow from the engine core into the chamber, and/or contacting the cooling tube with the hot secondary airflow in response to passing cooling bypass airflow through the cooling tube. The heat exchanger may be bolted to the chamber.

In various embodiments, the method may comprise producing a heated bypass airflow in response to the hot secondary airflow contacting the cooling tube. In various embodiments, the method may comprise venting the heated bypass airflow into the bypass airflow channel. In various embodiments, the method may comprise producing a cooled secondary airflow in response to the hot secondary airflow contacting the cooling tube. In various embodiments, the method may comprise directing the cooled secondary airflow out of the chamber through a chamber exit surface. The cooled secondary airflow may be directed to cool a high pressure turbine and/or a high pressure compressor.

In various embodiments, a system for cooling air may comprise a bypass airflow channel existing outside of an engine core, a chamber inside the engine core comprising a chamber outboard surface and/or a chamber interior, and/or a heat exchanger coupled to the chamber outboard surface. The heat exchanger may comprise a heat exchanger base and a cooling tube. The cooling tube may comprise a tube entrance end coupled to the heat exchanger base, a tube exit end coupled to the heat exchanger base, and/or a tube body between the tube entrance end and the tube exit end disposed inside the chamber interior. The tube body may encompass a tube interior, and the tube interior may be in fluid communication with the bypass airflow channel. In various embodiments, the tube interior may be physically isolated from the chamber interior.

In various embodiments, the chamber may further comprise a chamber side surface coupled to the chamber outboard surface. The chamber side surface may comprise a side surface inlet that may be configured to place a hot secondary airflow in physical contact with the cooling tube.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
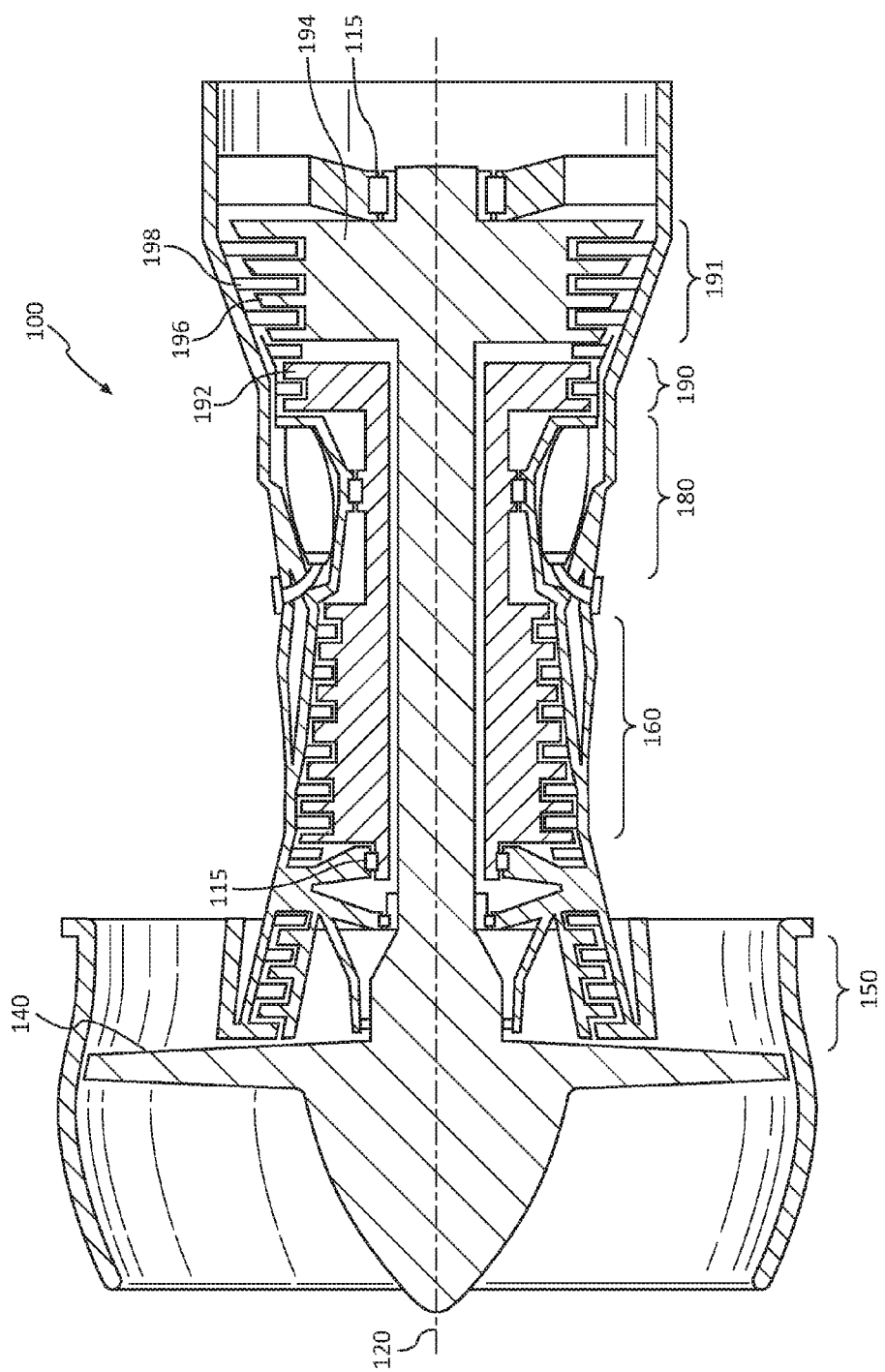
FIG. 1 illustrates a schematic cross-section view of a gas turbine engine, in accordance with various embodiments.

Referring to FIG. 1, a gas turbine engine 100 (such as a turbofan gas turbine engine) is illustrated according to various embodiments. Gas turbine engine 100 is disposed about axis of rotation 120. Gas turbine engine 100 may comprise a fan 140, compressor sections 150 and 160, a combustion section 180, and turbine sections 190, 191. Air compressed in compressor sections 150, 160 may be mixed with fuel and burned in combustion section 180 and expanded across turbine sections 190, 191. Turbine sections 190, 191 may include high pressure rotors 192 and low pressure rotors 194, which rotate in response to the expansion. Turbine sections 190, 191 may comprise alternating rows of rotary airfoils or blades 196 and static airfoils or vanes 198. A plurality of bearings 115 may support spools to which the rotors are affixed in gas turbine engine 100. FIG. 1 provides a general understanding of the sections in a gas turbine engine, and is not intended to limit the disclosure. The present disclosure may extend to all types of turbine engines, including turbofan gas turbine engines and turbojet engines, for all types of applications.

The forward-aft positions of gas turbine engine 100 lie along axis of rotation 120. For example, fan 140 may be referred to as forward of turbine section 190 and turbine section 190 may be referred to as aft of fan 140. Typically, during operation of gas turbine engine 100, air flows from forward to aft, for example, from fan 140 to turbine section 190. As air flows from fan 140 to the more aft components of gas turbine engine 100, axis of rotation 120 may also generally define the direction of the air stream flow.

Figure 2:
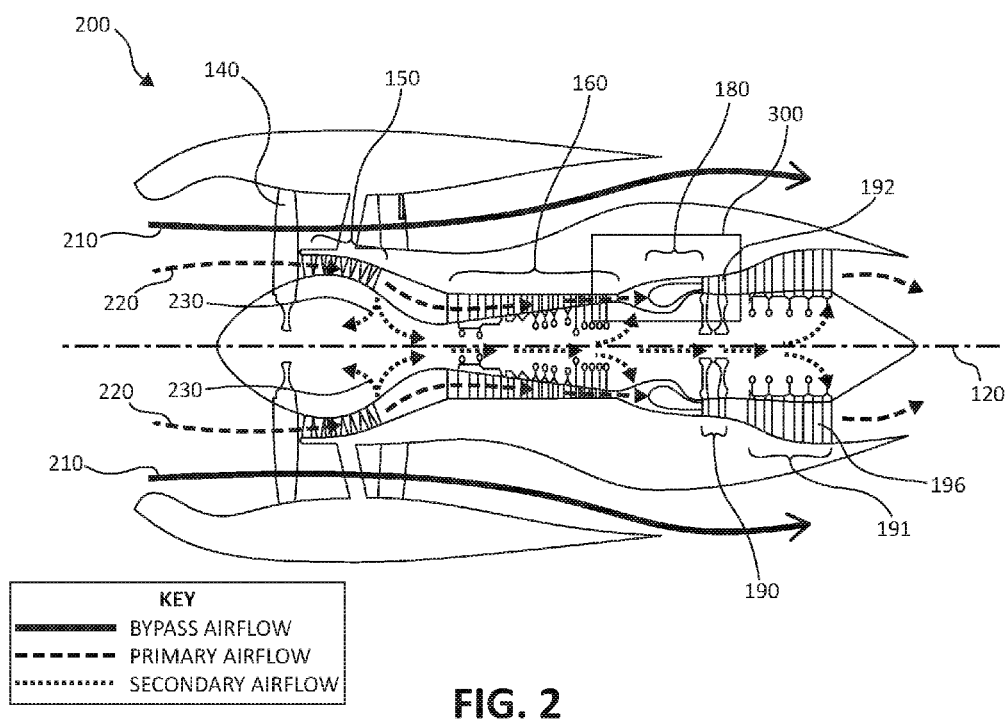
FIG. 2 illustrates a cross-section view of a gas turbine engine showing airflow patterns, in accordance with various embodiments.

Referring to FIG. 2, a gas turbine engine 200 is illustrated according to various embodiments. Elements with the like element numbering as depicted in FIG. 1, are intended to be the same and will not be repeated for the sake of clarity. In various embodiments, during operation of gas turbine engine 200, airflow that enters fan 140 may be divided between bypass airflow 210, primary airflow 220, and/or secondary airflow 230. Bypass airflow 210 provides the majority of the thrust produced by the gas turbine engine 200. In various embodiments, bypass airflow 210 may flow outside of the engine core in gas turbine engine 200. In various embodiments, bypass airflow 210 may comprise a second stream airflow and/or a third stream airflow. Primary airflow 220 may be compressed as it travels through compressor sections 150, 160, and then mixed with fuel and burned in combustion section 180. The burned mix of air and fuel may then expand across turbine sections 190, 191, turning the turbines and generating additional thrust. Secondary airflow 230 may be any airflow different from the bypass airflow 210 or primary airflow 220. Secondary airflow 230 may be utilized for multiple purposes including, for example, cooling and pressurization. Secondary airflow 230 may ultimately be at least partially injected into primary airflow 220 at various points to be used, for example, to cool various components.

Figure 3:
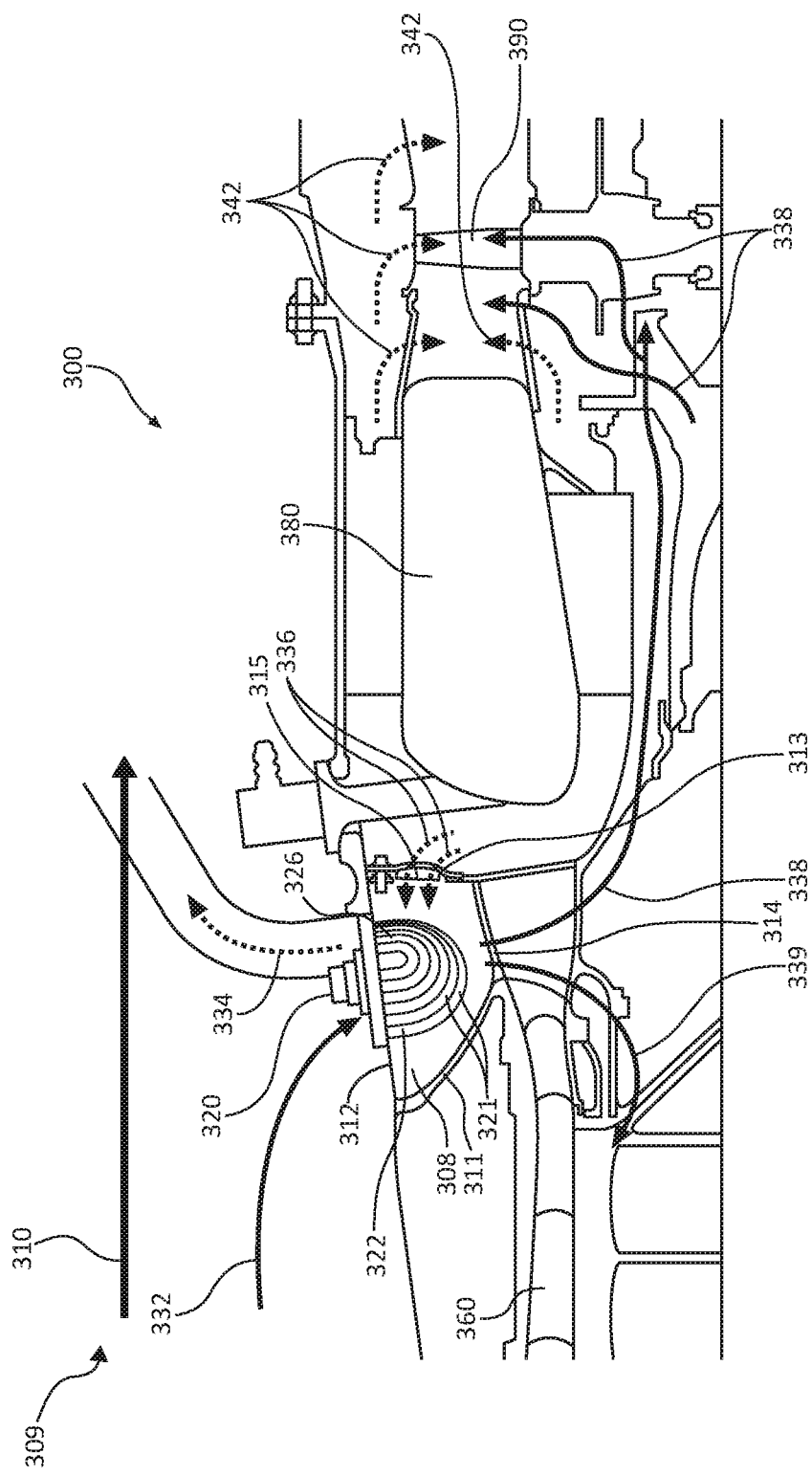
FIG. 3 illustrates a perspective view of a system for cooling airflow in a gas turbine engine, in accordance with various embodiments.

Referring to FIG. 3, an exemplary system for cooling airflow within a gas turbine engine is depicted. In various embodiments, the gas turbine engine may comprise an engine core 300. Engine core 300 may comprise a high pressure compressor (HPC) 360, a combustor 380, a high pressure turbine (HPT) 390, and/or a chamber 311. Chamber 311 may be disposed forward of combustor 380 and aft of HPC 360. In various embodiments, chamber 11 may be in any location within a gas turbine engine. Secondary airflow may flow throughout engine core 300 outside of HPC 360, combustor 380, and/or HPT 390, and primary airflow may flow inside HPC 360, combustor 380, and/or HPT 390.

In various embodiments, HPC 360, combustor 380, and/or HPT 390 may operate at relatively high temperatures (e.g., 1000° F./537° C. to 2000° F./1093° C. or higher). The airflow around HPC 360, combustor 380, and/or HPT 390 may similarly experience relatively high temperatures. In order for the gas turbine engine to continue optimal performance during operation, or improve performance during operation, HPC 360, combustor 380, and/or HPT 390 and the surrounding airflow may need to be cooled.

In various embodiments, chamber 311 may comprise a chamber outboard surface 312, a chamber side surface 313 coupled to chamber outboard surface 312, a chamber exit surface 314 coupled to chamber side surface 313 and/or chamber outboard surface 312, and/or a chamber interior 308 housed between the chamber surfaces. In various embodiments, chamber 311 may be any structure surrounding a heat exchanger 320 and/or cooling tubes 321 comprised within an engine core 300. In various embodiments, chamber 311 may be a shell and may be comprised as part of a heat exchanger 320, such as in a tube/shell heat exchanger. Chamber 311 may be configured to receive secondary airflow from engine core 300, which may be hot secondary airflow 336. Hot secondary airflow 336 may flow from a high pressure area into a low pressure area, such as chamber 311. Hot secondary airflow 336 may be cooled within chamber 311, via a heat exchanger 320, producing cooled secondary airflow 338, 339. For example, in various embodiments, hot secondary airflow 336 may enter chamber 311 through a side surface inlet 315 in chamber side surface 313. Hot secondary airflow 336 may be cooled to a lower temperature in chamber 311, producing cooled secondary airflow 338, 339. Cooled secondary airflow 338, 339 may exit chamber 311 through an exit hole (such as exit hole 416 in FIGS. 4A and 4B) in chamber exit surface 314 and be directed elsewhere in engine core 300 to cool various components, such as HPT 390. Cooled secondary airflow 338, 339 may be directed to various components within the gas turbine engine through struts and/or other structures.

In various embodiments, a heat exchanger 320 may be coupled to the engine core 300 at any location. In various embodiments, heat exchanger 320 may be coupled to chamber outboard surface 312. Heat exchanger 320 may be bolted or otherwise mounted onto chamber outboard surface 312. In various embodiments, heat exchanger 320 may be mounted to chamber 311 on any of the surfaces of chamber 311. In various embodiments, heat exchanger 320 may be integral with chamber 311.

Figure 4A:
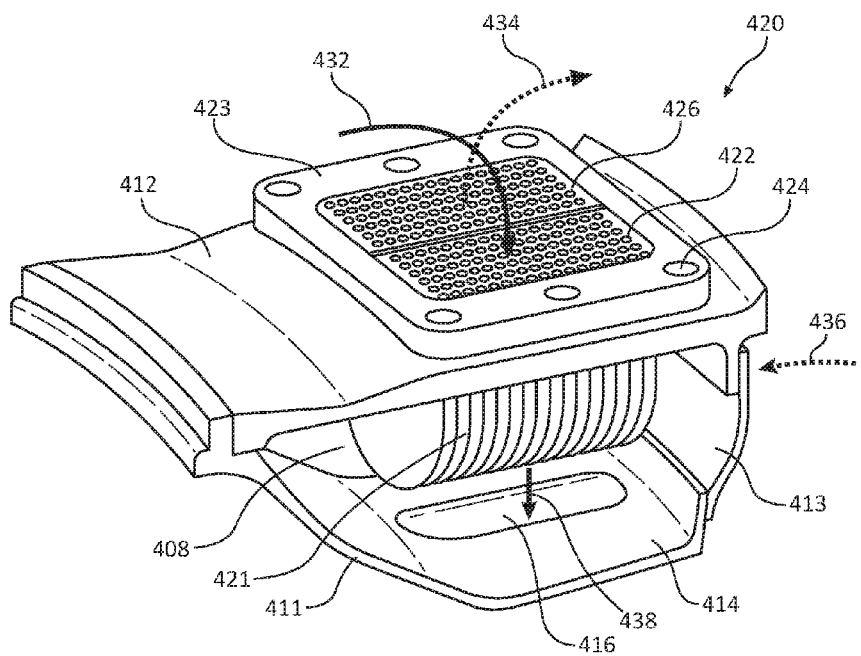
FIGS. 4A and 4B illustrate perspective views of a heat exchanger in a gas turbine engine, in accordance with various embodiments.
Figure 4B:
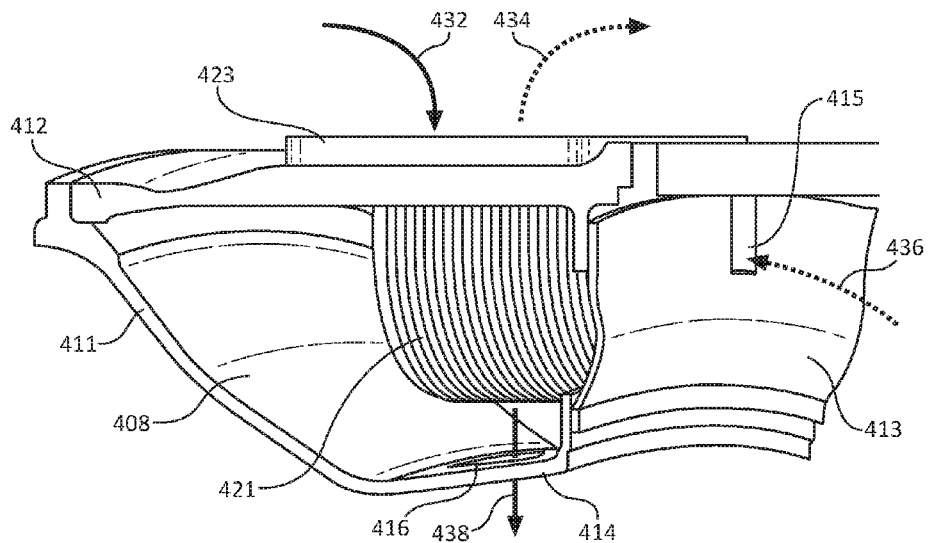

Referring to FIGS. 4A and 4B, in various embodiments, heat exchanger 420 may be coupled to chamber outboard surface 412 by bolts 424, or any other suitable coupling device. Heat exchanger 420 may comprise a heat exchanger base 423 and at least one cooling tube 421 coupled to heat exchanger base 423. In various embodiments, heat exchanger 420 may comprise numerous cooling tubes 421. Cooling tubes 421 may comprise a tube entrance end 422, a tube exit end 426, a tube body disposed therebetween, and a hollow tube interior. Tube entrance end 422 and/or tube exit end 426 may be open to airflow. In various embodiments, tube entrance end 422 and/or tube exit end 426 may be coupled to heat exchanger base 423. The tube body of cooling tube 421 may form a U-shape and may be disposed within chamber interior 408, as depicted by cooling tubes 321 in FIG. 3 and/or by cooling tubes 421 in FIGS. 4A, B. The tube body may form any other suitable configuration or shape, and there may be more than one area of heat exchanger 420 comprising tube entrance ends 422 and/or tube exit ends 426. Referring to FIGS. 3, 4A, and 4B, the tube bodies of cooling tubes 321, 421 may extend into chamber interior 308, 408 in a manner configured to cause hot secondary airflow 336, 436 coming into chamber interior 308, 408 to physically contact cooling tubes 321, 421.

Referring again to FIG. 3, in various embodiments, outside of engine core 300, the gas turbine engine may comprise a bypass airflow channel 309 through which a bypass airflow 310 may travel. Bypass airflow channel 309 may be in fluid communication with the tube bodies and/or tube interiors of cooling tubes 321 by being in fluid communication with tube entrance ends 322 and tube exit ends 326. In various embodiments, bypass airflow channel 309 may be in fluid communication with tube entrance ends 322 and tube exit ends 326 such that a cooling bypass airflow 332 may be directed from bypass airflow 310 and enter tube entrance end 322. Cooling bypass airflow 332 may travel through the tube bodies and tube interiors of cooling tubes 321, exit the tube bodies and tube interiors through tube exit ends 326, and rejoin bypass airflow 310 flowing through bypass airflow channel 309. The airflow that exits tube exit ends 326 may have been heated while in cooling tubes 321, and may be referred to as heated bypass airflow 334.

In operation, according to various embodiments, bypass airflow 310 may travel through bypass airflow channel 309. A portion of bypass airflow 310 may be directed to enter cooling tubes 321 through tube entrance ends 322 as cooling bypass airflow 332. Cooling bypass airflow 332 traveling through cooling tubes 321 may cool cooling tubes 321. Cooling tubes 321 may be disposed in chamber interior 311.

In various embodiments, hot secondary airflow 336 may enter chamber interior 308 through side surface inlet 315 in chamber side surface 313. Side surface inlet 315 in chamber side surface 313 may be configured to cause hot secondary airflow 336 to physically contact cooling tubes 321, which may be cooled by cooling bypass airflow 332 passing therethrough. In response to hot secondary airflow 336 physically contacting cooling tubes 321, hot secondary airflow 336 may be cooled, and in response, a cooled secondary airflow 338, 339 may be produced. Also in response to hot secondary airflow 336 physically contacting cooling tubes 321, cooling bypass airflow 332 may absorb heat from hot secondary airflow 336, producing heated bypass airflow 334. Stated another way, heat may be exchanged between cooling bypass airflow 332 and hot secondary airflow 336 in response to hot secondary airflow 336 contacting cooling tubes 321 with cooling bypass airflow 332 in them, producing heated bypass airflow 334 and cooled secondary airflow 338, 339. Heated bypass airflow 334 may exit cooling tubes 321 and heat exchanger 320 through tube exit ends 326 and rejoin bypass airflow 310. In various embodiments, the tube interior, through which cooling bypass airflow 332 may travel, may be physically isolated from chamber interior 308. Accordingly, cooling bypass airflow 332 and hot secondary airflow 336 may never come into physical contact and/or mix with one another.

In various embodiments, engine core 300 may be configured to direct all hot secondary airflow 336 flowing in engine core 300 to enter chamber interior 308 and be cooled by cooling tubes 321. In various embodiments, the engine core 300 may be configured to direct a portion of hot secondary airflow 336 in the engine core 300 to enter chamber interior 308 and be cooled. In that case, some remaining hot secondary airflow 342 may not be cooled by cooling tubes 321 in chamber 311.

In various embodiments, cooled secondary airflow 338, 339 may exit chamber interior 308 through chamber exit surface 314 and be directed to cool other components of the gas turbine engine. In various embodiments, cooled secondary airflow 38, 339 may mix with hot secondary airflow 342 that was not cooled in chamber 311 by heat exchanger 320. In various embodiments, chamber exit surface 314 may be any surface of chamber 311. In various embodiments, after exiting chamber 311, cooled secondary airflow 339 may be directed forward toward HPC 360 to cool HPC 360. Cooled secondary airflow 338 may be directed aft toward HPT 390 to cool HPT 390.

As depicted in FIGS. 4A and 4B, in accordance with various embodiments, cooling bypass airflow 432 may enter cooling tubes 421 through tube entrance ends 422, resulting in the cooling of cooling tubes 421. Hot secondary airflow 436 may enter chamber interior 408 through a side surface inlet 415 in chamber side surface 413 and physically contact cooling tubes 421. A heat exchange may occur between cooling bypass airflow 432 and hot secondary airflow 436 in response to the physical contact. The heat exchange may produce heated bypass airflow 434, which may exit cooling tubes 421 and heat exchanger 420 through tube exit ends 426. The heat exchange may produce cooled secondary airflow 438, which with may exit chamber interior 408 through exit hole 416 in chamber exit surface 414. Heated bypass airflow 434 may be vented to join the bypass airflow flowing through the bypass airflow channel. Cooled secondary airflow 438 may be directed to cool components within the gas turbine engine.

Returning to FIG. 3, in various embodiments, having heat exchanger 320 mounted directly to engine core 300 (to chamber 311) improves safety during gas turbine engine operation. Unlike traditional heat exchanger configurations in gas turbine engines, hot secondary airflow 336 does not have a need to be rerouted out engine core 300 to be cooled in heat exchanger 320. Hot secondary airflow 336 remains in engine core 300 throughout the entire heat exchange process. Additionally, traditional heat exchanger systems in gas turbine engines may cause hot secondary airflow to travel through cooling tubes in a heat exchanger, and bypass airflow flows around the cooling tubes to cool the hot secondary air. In such a configuration, a broken cooling tube would lose a significant amount of the secondary airflow (i.e., 25%). In the present disclosure, cooling bypass airflow 332 flows through cooling tubes 321 to cool hot secondary airflow 336 which flows around cooling tubes 321 in chamber interior 308. A broken cooling tube would result in a very minor loss in secondary airflow (i.e., less than 1% in various embodiments) because engine core 300 is not configured to cause hot secondary airflow 336 to flow through cooling tubes 321.

Figure 5:
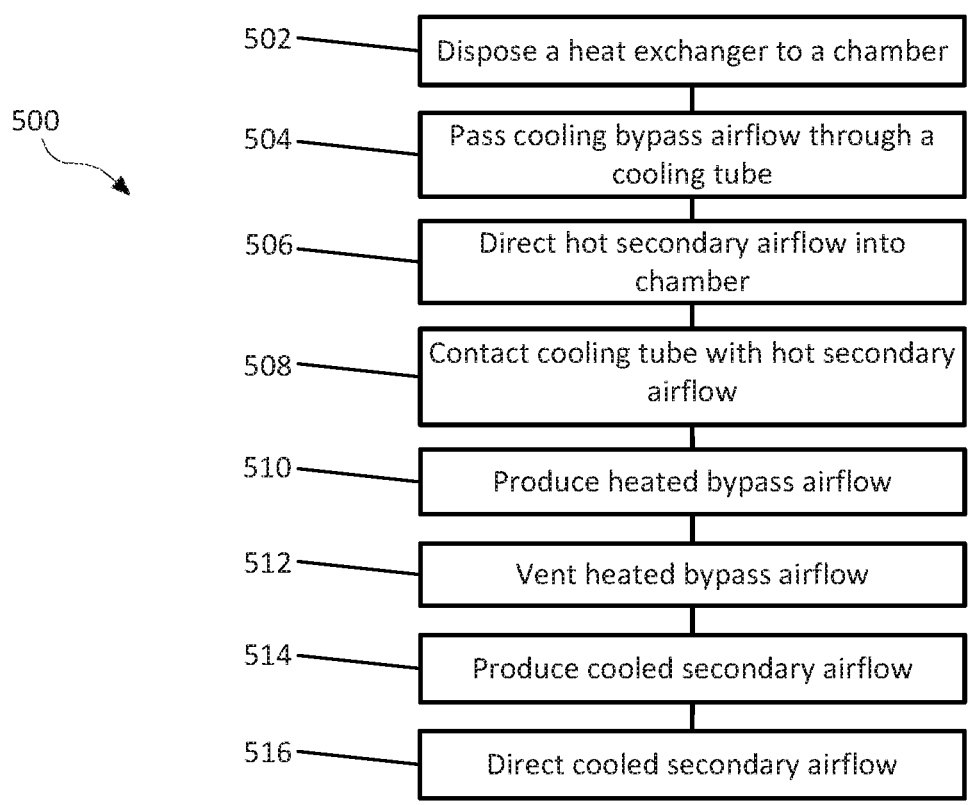
FIG. 5 illustrates a method for cooling airflow in a gas turbine engine, in accordance with various embodiments.

As depicted in FIG. 5, in accordance with various embodiments, a method for cooling airflow in a gas turbine engine is depicted. With combined reference to FIGS. 3 and 5, in various embodiments, a heat exchanger 320 may be coupled or disposed to a chamber 311 (step 502). Chamber 311 and/or heat exchanger 320 may be comprised within an engine core 300. Heat exchanger 320 may be coupled to chamber outboard surface 312 or any other surface of chamber 311, and bolted or otherwise mounted to chamber 311. Cooling tubes 321 of heat exchanger 320 may be disposed in chamber interior 308. Cooling bypass airflow 332 may pass through a cooling tube 321 (step 504) and may cool cooling tube 321. Hot secondary airflow 336 may be directed into chamber 311 (step 506). Hot secondary airflow 336 may contact cooling tube 321 (step 508) in chamber 311. In response to hot secondary airflow 336 contacting cooling tube 321 with cooling bypass airflow 332 flowing through cooling tube 321, heat may be exchanged between hot secondary airflow 336 and cooling bypass airflow 332. Cooling bypass airflow 332 may receive heat from hot secondary airflow 336, producing heated bypass airflow 334 (step 510). Heated bypass airflow 334 may be vented out heat exchanger 320 (step 512) through tube exit end 326. Heated bypass airflow 334 may join bypass airflow 310. Hot secondary airflow 336 may be cooled by cooling bypass airflow 332, producing cooled secondary airflow 338, 339 (step 514). Cooled secondary airflow 338, 339 may be exit chamber 311 and be directed (step 516) to other components of the gas turbine engine to cool those components. For example, cooled secondary airflow 338 may be directed to cool HPC 360, and/or cooled secondary airflow 339 may be directed to cool HPT 390.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine, comprising;
an engine core;
a heat exchanger coupled to the engine core, wherein the heat exchanger comprises a heat exchanger base and a cooling tube, the cooling tube is disposed inside the engine core, and the cooling tube comprises a tube entrance end coupled to the heat exchanger base, a tube exit end coupled to the heat exchanger base, and a tube body between the tube entrance end and the tube exit end, the tube body comprising a tube interior; and
a chamber surrounding the heat exchanger and configured to receive hot secondary airflow from the engine core and cool the hot secondary airflow from the engine core to produce cooled secondary airflow to be directed to cool other parts of the gas turbine engine, wherein the cooling tube is disposed within the chamber and the hot secondary airflow from the engine core is configured to remain within the engine core during a heat exchange process.

2. The gas turbine engine of claim 1, wherein the chamber comprises a chamber outboard surface and a chamber interior, wherein the heat exchanger is coupled to the chamber outboard surface, and the cooling tube is disposed within the chamber interior.

3. The gas turbine engine of claim 2, wherein the chamber further comprises a chamber side surface coupled to the chamber outboard surface, and the chamber side surface comprises a side surface inlet configured to allow the hot secondary airflow into the chamber interior.

4. The gas turbine engine of claim 3, wherein the chamber further comprises a chamber exit surface coupled to at least one of the chamber outboard surface or the chamber side surface, and the chamber exit surface comprises an exit hole configured to allow the cooled secondary airflow out of the chamber interior.

5. The gas turbine engine of claim 2, wherein the engine core is configured to have an entirety of the hot secondary airflow travel into the chamber interior.

6. The gas turbine engine of claim 2, wherein the heat exchanger is bolted to the chamber outboard surface.

7. The gas turbine engine of claim 2, wherein the tube interior is physically isolated from the chamber interior.

8. The gas turbine engine of claim 1, further comprising:
a bypass airflow channel disposed outside of the engine core, wherein the bypass airflow channel is configured to allow a bypass airflow;
wherein the tube entrance end and the tube exit end are in fluid communication with the bypass airflow channel, and the cooling tube is configured to allow cooling bypass airflow to enter the tube interior through the tube entrance end and exit the tube interior through the tube exit end.

9. The gas turbine engine of claim 1, wherein the heat exchanger is configured to cool the hot secondary airflow in the chamber to produce the cooled secondary airflow.

10. The gas turbine engine of claim 1, wherein the heat exchanger is disposed forward of a combustor.

11. A method of cooling airflow in a gas turbine engine, comprising:
passing a cooling bypass airflow, from a bypass airflow channel disposed outside of an engine core, through a cooling tube disposed in a heat exchanger, wherein the heat exchanger is coupled to a chamber surrounding the heat exchanger and is configured to receive hot secondary airflow from the engine core and cool the hot secondary airflow from the engine core to produce cooled secondary airflow to be directed to cool other parts of the gas turbine engine, wherein the cooling tube is disposed within the chamber and the hot secondary airflow from the engine core is configured to remain within the engine core during a heat exchange process;
directing the hot secondary airflow from the engine core into the chamber; and
contacting the cooling tube with the hot secondary airflow in response to the passing the cooling bypass airflow through the cooling tube.

12. The method of claim 11, further comprising producing a heated bypass airflow in response to the hot secondary airflow contacting the cooling tube.

13. The method of claim 12, further comprising venting the heated bypass airflow into the bypass airflow channel.

14. The method of claim 11, further comprising producing the cooled secondary airflow in response to the hot secondary airflow contacting the cooling tube.

15. The method of claim 11, further comprising directing the cooled secondary airflow out of the chamber through a chamber exit surface.

16. The method of claim 11, wherein the cooled secondary airflow is directed to cool at least one of a high pressure turbine or a high pressure compressor.

17. The method of claim 11, wherein the heat exchanger is bolted to a chamber outboard surface.

18. A system for cooling air, comprising:
a bypass airflow channel disposed outside of an engine core;
a chamber disposed inside the engine core and comprising:
a chamber outboard surface; and
a chamber interior; wherein the chamber surrounds a heat exchanger and is configured to receive hot secondary airflow from the engine core and cool the hot secondary airflow from the engine core to produce cooled secondary airflow to be directed to cool other parts of an engine, wherein a cooling tube is disposed within the chamber and the hot secondary airflow from the engine core is configured to remain within the engine core during a heat exchange process; and
the heat exchanger coupled to the chamber outboard surface and comprising:
a heat exchanger base; and
the cooling tube comprising a tube entrance end coupled to the heat exchanger base, a tube exit end coupled to the heat exchanger base, and a tube body between the tube entrance end and the tube exit end disposed inside the chamber interior, the tube body comprising a tube interior, wherein the tube interior is configured for fluid communication with the bypass airflow channel.

19. The system of claim 18, wherein the chamber further comprises a chamber side surface coupled to the chamber outboard surface, wherein the chamber side surface comprises a side surface inlet that is configured to place the hot secondary airflow in physical contact with the cooling tube.

20. The system of claim 18, wherein the tube interior is physically isolated from the chamber interior.

* * * * *